United States Patent [19]

Gamblin et al.

[11] 4,305,655

[45] Dec. 15, 1981

[54] DUPLEX PRINTER AND METHOD OF PRINTING

[75] Inventors: Rodger L. Gamblin, Oakwood, Ohio; Roger D. Wells, Garland, Tex.

[73] Assignee: The Mead Corporation, Dayton, Ohio

[21] Appl. No.: 102,179

[22] Filed: Dec. 10, 1979

[51] Int. Cl.[3] .......................... G03B 27/32; G03B 27/52

[52] U.S. Cl. .......................................... 355/24; 271/3.1; 271/4; 271/9; 271/65; 271/163; 271/186; 355/3 SH

[58] Field of Search ............ 355/3 SH, 14 SH, 23-26; 271/3.1, 4, 9, 65, 186, 163

[56] References Cited

U.S. PATENT DOCUMENTS

| | | | |
|---|---|---|---|
| 3,905,697 | 9/1975 | Komori et al. | 355/26 |
| 3,997,263 | 12/1976 | Stemmle | 355/24 |
| 4,050,805 | 9/1977 | Hage | 271/163 X |
| 4,099,150 | 7/1978 | Connin | 355/23 X |
| 4,109,903 | 8/1978 | Stange et al. | 355/24 X |
| 4,116,558 | 9/1978 | Adamek et al. | 355/24 |
| 4,140,387 | 2/1979 | Gustafson | 355/23 X |
| 4,158,500 | 6/1979 | Di Francesco et al. | 355/23 X |

*Primary Examiner*—Richard A. Wintercorn

*Attorney, Agent, or Firm*—Biebel, French & Nauman

[57] ABSTRACT

A duplex printing arrangement is provided for printing on both sides of a plurality of rectangular sheets of paper, each of the sheets having a pair of parallel opposite edges which are shorter than the pair of edges perpendicular thereto. Each of the sheets is transported past a printer in a direction parallel to the longer pair of the edges of the sheet. The sheets are printed on a first side as they are moved past the printer with a first edge of the pair of shorter edges being the leading edge. The sheets are thereafter turned end-for-end and moved past the printer for printing a second side of each of the sheets, with the second printing pass being such that the first edge of each of the sheets is again the leading edge.

12 Claims, 6 Drawing Figures

DUPLEX PRINTER AND METHOD OF PRINTING

BACKGROUND OF THE INVENTION

The present invention relates to duplex printing devices and methods and, more particularly, to a means and method for printing a print image on both sides of a sheet of paper with the top of the print image on each side being adjacent the same edge of the sheet.

A number of different systems have been proposed for duplex printing. Typically, a sheet of copy paper is fed from a first paper supply station to a printer transport, such as the rotating drum in a xerographic reproduction device, which transports the sheet past a printer at a printing station where a print image is printed on a first side of the sheet. A plurality of sheets may be accumulated in a duplex collection tray after having print images printed on their first sides. In such systems, the sheets are moved past the print station with one of the longer edges of each sheet being the leading edge. Printing is thus accomplished from side to side across a first side of each sheet during the first printing operation, with the first side of each sheet having been originally facing downward at the first paper supply station. In a second printing operation, sheets are fed in succession from the duplex collection tray to the drum with the other of the longer edges of each sheet being the leading edge. The sheets are delivered to the drum in such a manner that the second sides of the sheets, which were facing downward in the duplex collection tray, face the printer at the printing station for printing.

It will be appreciated that where a sheet of paper is presented to a rotating drum for transport past a printer and thereafter the sheet is stored in an intermediate duplex tray, the edge of the sheet which was the leading edge as the sheet moved past the print station and into the duplex tray will be the trailing edge as the sheet is reapplied to the drum. It is inherent in such a system that if the drum is rotated continuously in the same direction, the second side of each sheet is presented for printing during the second printing operation.

A number of such duplex printing systems have been devised, as shown in U.S. Pat. Nos. 3,905,697, issued Sept. 16, 1975, to Komori et al; 3,997,263, issued Dec. 14, 1976, to Stemmle; 4,050,805, issued Sept. 27, 1977, to Hage; 4,099,150, issued July 4, 1977, to Connin; and 4,116,558, issued Sept. 26, 1978, to Adamek et al. In duplex printing arrangements of the type disclosed in these patents, the orientation of the print image is the same during each printing pass. That is, if during the first printing pass, the paper which is transported with one of its longer edges as the leading edge is printed from left to right, the second side of the sheets of paper are also printed from left to right during the second printing pass. The result is that the top of the print image on the first side of each sheet is adjacent the same shorter edge of the sheet as the top of the print image on the second side of each sheet. This print image orientation occurs, however, only when the sheets are transported past the printer with one of their longer edges being the leading edge.

It is desirable to be able to print in a duplex mode on both sides of a sheet of paper utilizing a printer, such as an ink jet printer which prints with successive sheets of paper moving past the printer with a shorter of the paper edges being the leading edge. If such a printer is simply incorporated into prior art printing schemes, however, the sheets so printed will have the print image on the second side of each sheet inverted with respect to the print image on the first side. That is, the tops of the print images on opposite sides of a sheet will be adjacent opposite edges of the sheet. While this may be desirable in certain instances, for example, where the sheets are to be bound across their upper edges, binding the sheets in a booklike format along the left edges of the sheets will not be possible, since the image on the back or second side of each sheet will be inverted.

SUMMARY OF THE INVENTION

A duplex printing arrangement for printing on both sides of a plurality of rectangular sheets of paper, each of said sheets having a pair of parallel opposite edges, includes a printer for printing a print image on a sheet as the sheet is transported past the printer in a direction perpendicular to the pair of parallel opposite edges. A paper transport means is provided for transporting a sheet of paper past the printer in a direction perpendicular to the pair of parallel opposite edges. A first paper supply means supplies each of the plurality of sheets in succession to the paper transport means such that a first side of each of the sheets is facing the printer for printing thereon, and a first edge of the pair of parallel opposite edges of each sheet precedes the other of the pair of parallel opposite edges as each sheet is transported past the printer by the paper transport means. A second paper supply means receives each of the sheets of paper from the paper transport means after a print image is printed thereon. After the first sides of the plurality of sheets are printed, the second paper supply means supplies each of the plurality of sheets in succession to the paper transport means such that a second side of each of the sheets is facing the printer and the first edge of each sheet precedes the other of the pair of parallel opposite edges as the sheet is transported past the printer by the paper transport means, whereby the top of the print images on both sides of each sheet of paper are adjacent the same edge of each sheet.

The duplex printing arrangement may further comprise output means for receiving each of the plurality of sheets of paper from the paper transport means after the second side of each sheet has been printed.

The second paper supply means comprises a paper receiving tray for receiving successively sheets of paper from the paper transport means after a print image is printed thereon, with each sheet moving into the tray with the first edge of each sheet being the leading edge. The second paper supply means further comprises means for rotating the paper receiving tray and the sheets of paper end-for-end such that the plurality of sheets of paper are thereafter supplied in succession to the paper transport means with the first edge of each sheet being the leading edge.

The paper transport means may include a paper supporting drum positioned adjacent the printer and means for rotating the drum. The paper transport means may further comprise means for transporting each of the sheets of paper from the first paper supply means to the paper supporting drum, and means for transporting the sheets of paper between the second paper supply means and the drum.

The paper transport means may comprise first paper moving means extending between the first paper supply means and the drum for loading a sheet of paper from the first paper supply means onto the drum such that a print image may be printed on the first side thereof. The paper transport means further includes second paper moving means extending between the drum and the second paper supply means for moving a sheet of paper from the drum to the second paper supply means and means for supplying a sheet of paper from the second paper supply means to the first paper moving means such that a print image may be printed on the second side of the sheet. The paper transport means may also comprise means for moving the second paper moving means with respect to the output means such that the second paper moving means extends between the drum and the output means and the output means receives each of the sheets of paper after the second side of each sheet has been printed.

The first and second paper supply means and the output means may be stationary and the second paper moving means may be movable from a first position in which it extends between the drum and the second paper supply means to a second position in which it extends between the drum and the output means. Alternatively, the means for supplying a sheet of paper from the second paper supply means to the first paper moving means may comprise means for moving the second paper supply means into position adjacent the first paper moving means. In such an arrangement, the first and second paper moving means are stationary and the means for moving the second paper moving means with respect to the output means comprises means for moving the output means into position adjacent the second paper moving means.

The method of duplex printing on sheets having a pair of parallel opposite edges includes the steps of:

(a) transporting each of the plurality of sheets of paper in succession past a printer in a direction perpendicular to the pair of parallel opposite edges of the sheet with a first side of each of the sheets facing the printer and a first edge of each of the sheets being the leading edge, (b) printing a print image on the first side of each of the sheets as each of the sheets is transported past the printer, (c) accumulating the sheets of paper at a paper duplexing station as the first side of each of the sheets is printed, (d) transporting each of the sheets of paper collected at the duplex station past the printer in succession with the first edge of each of the sheets being the leading edge and the second side of each of the sheets facing the printer, (e) printing a print image on the second side of each of the sheets as each of the sheets is transported past the printer, and (f) accumulating the plurality of sheets after printing on both sides thereof.

The step of accumulating sheets of paper at the paper duplex station may include the further step of rotating the plurality of sheets and end-for-end at the paper duplex station.

Accordingly, it is an object of the present invention to provide a simplified duplex printing arrangement and method in which print images are printed on both sides of a plurality of sheets of paper by a printer as the sheets of paper are moved past the printer with a first of the edges of each sheet being the leading edge; to provide such a printing arrangement and method in which sheets of paper are accumulated at a duplex station after printing the first side of each sheet and prior to printing the second side of each of the sheets; to provide such a printing arrangement and method in which the sheets of paper are rotated end-for-end at the duplex station; and to provide such a printing arrangement and method in which a plurality of sheets of paper may be transported between paper supply stations, an output station, and the printer to effect duplex printing with the tops of the print images on both sides of each sheet being adjacent the same edge of the sheet.

DETAILED DESCRIPTION OF THE PREFERRED EMBODIMENTS

Figure 1:
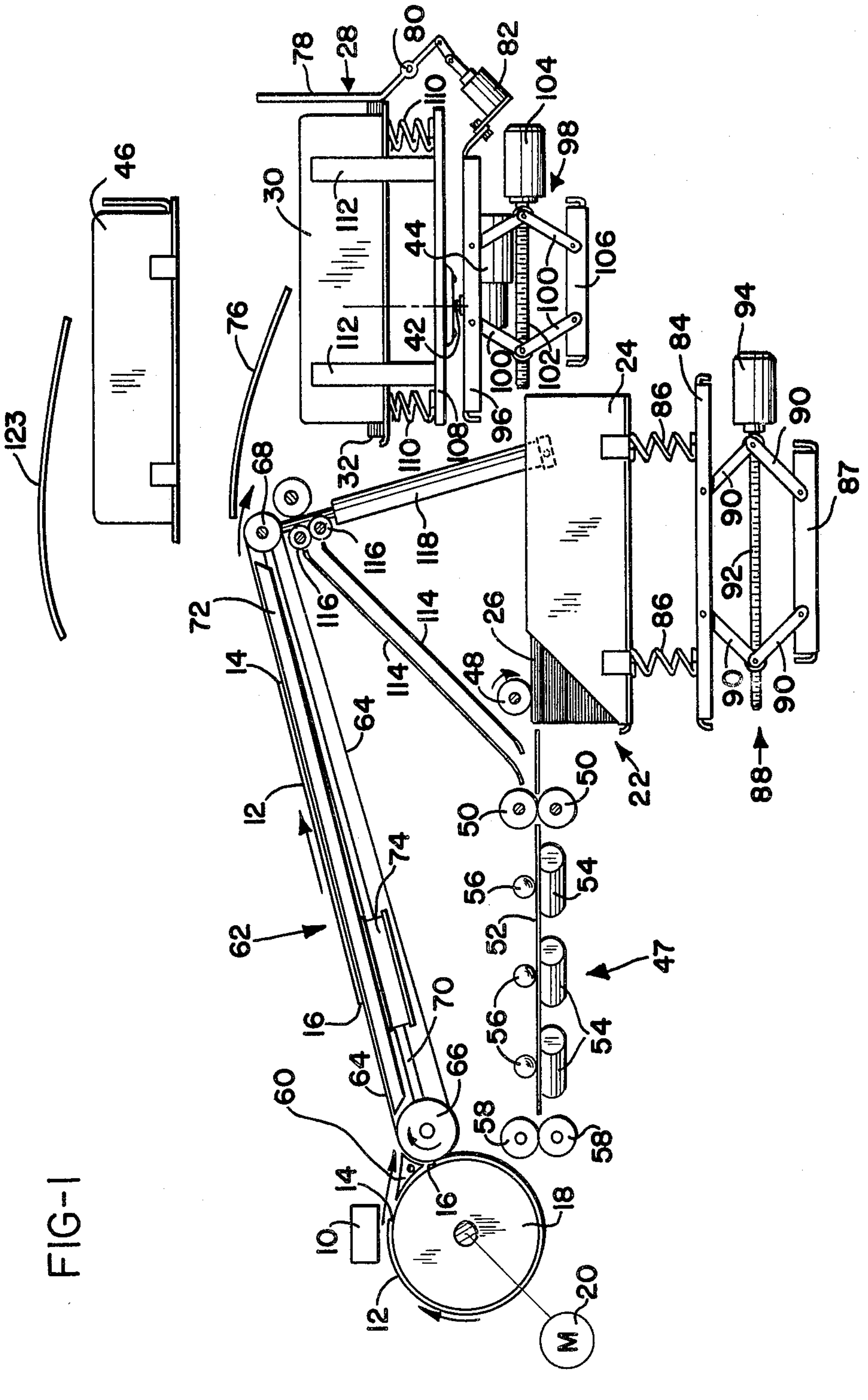
FIG. 1 is a view illustrating a first embodiment of the duplex printing arrangement of the present invention during printing of a first side of each of a plurality of sheets of paper.

FIG. 1 illustrates a first embodiment of the duplex printing apparatus of the present invention. The system includes a printer 10 for printing a print image on a sheet of paper 12. Printer 10 may be an ink jet printer of the type disclosed in U.S. Pat. No. 3,701,998, issued Oct. 31, 1972, to Mathis. Sheet 12 is a rectangular sheet having a pair of parallel opposite edges 14 and 16 which are shorter than the pair of edges perpendicular thereto. Sheet 12 may, for example, be an $8\frac{1}{2}$ inch by 11 inch letter size sheet of paper. Printer 10 prints on sheet 12 as the sheet is transported past the printer 10 in a direction which is parallel to the longer pair of edges of the sheet. A paper transport means, including paper supporting drum 18, continuously driven by drive motor 20, is provided for transporting sheet 12 past the printer 10 in a direction parallel to the longer pair of edges of the sheet 12. Printer 10 may generate a plurality of jet drop streams spaced axially along drum 18 for depositing drops of ink on paper 12 in response to appropriate print control signals applied to the printer, thus printing a print image on the sheet of paper 12.

A first paper supply means 22, including paper supporting tray 24, supplies each of a plurality of sheets in stack 26 in succession to the paper transport means such that a first side of each of the sheets 12 is facing the printer 10 for printing thereon and a first edge 14 of the pair of shorter edges precedes the other of the pair of shorter edges 16 as each sheet is transported past the printer 10 by the paper transport means.

A second paper supply means 28, including tray 30, receives each of the sheets of paper 12 from the paper transport means after a print image is printed on the sheets. Note that while the first side of each of the sheets 12 which is printed during the first printing operation faces downward in the stack of sheets 26, the first side of the sheets 12 face upward in the stack 32 accumulated in the paper receiving tray 30.

Figure 3:
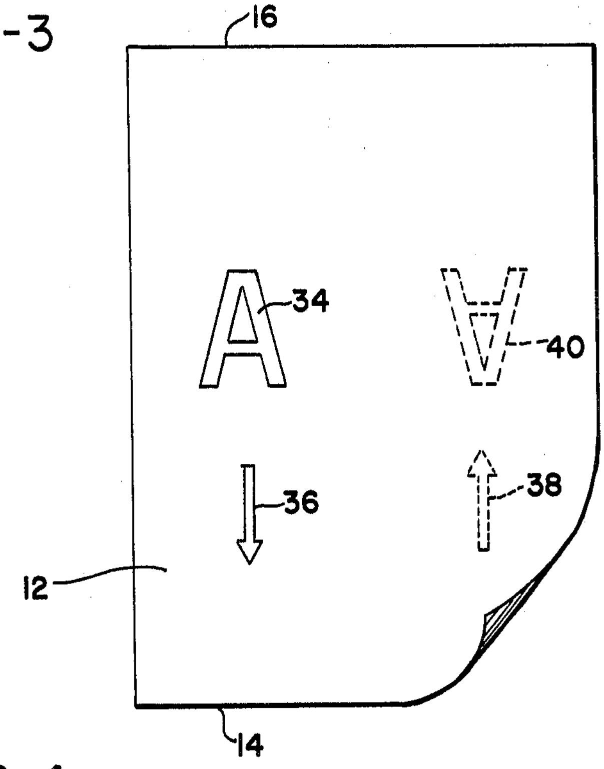
FIGS. 3 and 4 are diagrammatic views of sheets of paper after having a print image printed on both sides of the sheet.

FIG. 3 illustrates a sheet of paper 12 which has been printed with a print image 34 on a first side of the sheet as the sheet was moved past the printer in the direction of arrow 36. If the stack of sheets of paper 32 were to be simply fed in succession from the second paper supply means 28 to the drum 18, it will be appreciated that, although each of the sheets would be positioned on the drum 18 such that the second side of the sheet is facing the printer 10, edge 16 of each sheet would be the leading edge and, as a result, the print image printed on the second side of the sheet, as the sheet is moved in the direction of arrow 38, would be oriented as shown by image 40 in FIG. 3. The result, therefore, would be a duplex printed sheet in which the print image on the second side of the sheet would be inverted with respect to the print image printed on the first side of the sheet. While this is acceptable for printing sheets of paper which are to be bound along their upper edges, binding of sheets along the left hand edges, as is usual in the case of books requires that the tops of the print images on both sides of each sheet be adjacent the same edge of the sheet. While the print control signals supplied to printer 10 could be processed during printing of the second side of each sheet so as to invert effectively the print image, many applications of duplex printing, including copiers and duplicators, are such that the print control signals are conveniently available for printing each of the print images in only a single orientation.

Figure 4:
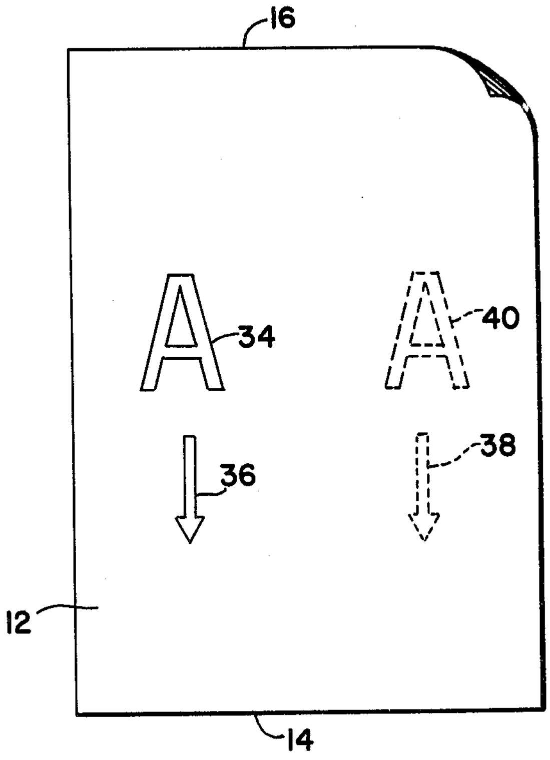

As a consequence, the tray 30 is mounted on a rotatable shaft 42, driven by motor 44 for rotating the tray 30 and the sheets of paper 32 end-for-end such that the sheets 32 of paper may thereafter be supplied in succession to the paper transport means with the first edge 14 of each sheet 12 being the leading edge. The second paper supply means 28 thus supplies each of the plurality of sheets 32 in succession to the paper transport means such that a second side of each of the sheets is facing the printer 10 and the first edge 14 precedes the other of the pair of shorter edges 16 as each sheet is transported past the printer. By this technique, the top of the print images on both sides of each sheet of paper are adjacent the same edge of each sheet, as illustrated in FIG. 4.

The duplex printing arrangement of the present invention further comprises an output means, including output tray 46 for receiving each of the plurality of sheets 12 of paper from the paper transport means after the second side of each sheet has been printed.

The paper transport means further comprises first paper moving means 47 which extends between the first paper supply means 22 and the drum 18, for loading a sheet of paper from the first paper supply means onto the drum 18 such that a print image may be printed on the first side of the sheet. The first paper moving means 47 includes a feed roller 48 which contacts the top sheet of the stack 26. Roller 48 presents each sheet to pinch rollers 50 such that the leading edge 14 is engaged between pinch rollers 50. Rollers 50 extend through an opening in plate 52 defining a sheet support surface. When rollers 50 are rotated, they slide a sheet 12 along this surface. A series of skewed driven rollers 54 and rotatable balls 56 engage the sheet and move the sheet of paper toward the drum 18, as well as shifting the sheet laterally against a lateral alignment bar (not shown). The sheet is thereafter engaged by pinch rollers 58 which deliver the sheet for loading onto drum 18. Drum 18 may be a vacuum drum having a plurality of circumferentially and radially displaced vacuum openings in its exterior surface for securely engaging and mounting a sheet of paper for rotation past the printer 10.

Printing of the print image on the first side of the sheet 12 is accomplished during one or more rotations of the drum 18. The sheet 12 is thereafter stripped from the drum surface by a plurality of fingers 60 which are pivoted by an actuator (not shown) to engage the leading edge 14 of the sheet. Drum 18 may define shallow circumferential grooves into which fingers 60 are received, if desired.

The sheet of paper is then delivered to a second paper moving means 62 which extends between the drum 18 and the second paper supply means 28, as illustrated in FIG. 1, during printing of the first side of each of a plurality of sheets. The second paper moving means 62 moves each of the sheets from the drum 18 to the second paper supply means 28. Second paper moving means 62 may include a series of vacuum belts 64 which extend between a drive pulley 66, and an idler pulley 68, both of which are mounted on a support arm 70. A vacuum plenum 72 is connected through chamber 74 to a vacuum source. The partial vacuum in plenum 72 holds the sheets of paper 12 on the porous vacuum belts 64 as the belts are driven by the rotation of drive pulley 66, connected to a drive motor (not shown).

After printing of the first side of each of the sheets, therefore, the sheet is transported by the vacuum belts 64 into the tray 30, with the trajectory of each sheet leaving the belts 64 being guided by wire form paper guides 76. The back of the tray 30 is open; however, a pivotable back stop 78 is provided for preventing the flight of a sheet of paper leaving the vacuum belt 64 from carrying the sheet beyond the tray 30. Paper back stop 78 may be pivoted about pivot point 80 by solenoid actuator 82 such that it moves away from tray 30, in a manner described more completely below.

The first paper supply means 22 includes a platen 84 upon which tray 24 is mounted by means of coil compression springs 86. The vertical position of platen 84 is controlled by a scissors actuation mechanism 88 including scissors arms 90, threaded rod 92, and motor 94, for adjusting the position of the platen 84 above a fixed support plate 87. Platen 84 is raised until the top sheet on the stack 26 is urged against roller 48 with a predetermined spring force from springs 86.

Similarly, shaft 42 and motor 44 are mounted on platen 96, the vertical position of which is controlled by scissors actuation mechanism 98 which includes scissors arms 100, threaded shaft 102, and motor 104. Scissors mechanism 98 controls the vertical position of platen 96 with respect to fixed plate 106. Tray 30 is mounted on an intermediate plate 108 by means of springs 110, with the vertical movement of the tray 30 being guided by guides 112. Similar guides may be mounted on platen 84, if desired, for guiding the vertical movement of tray 24.

Figure 2:
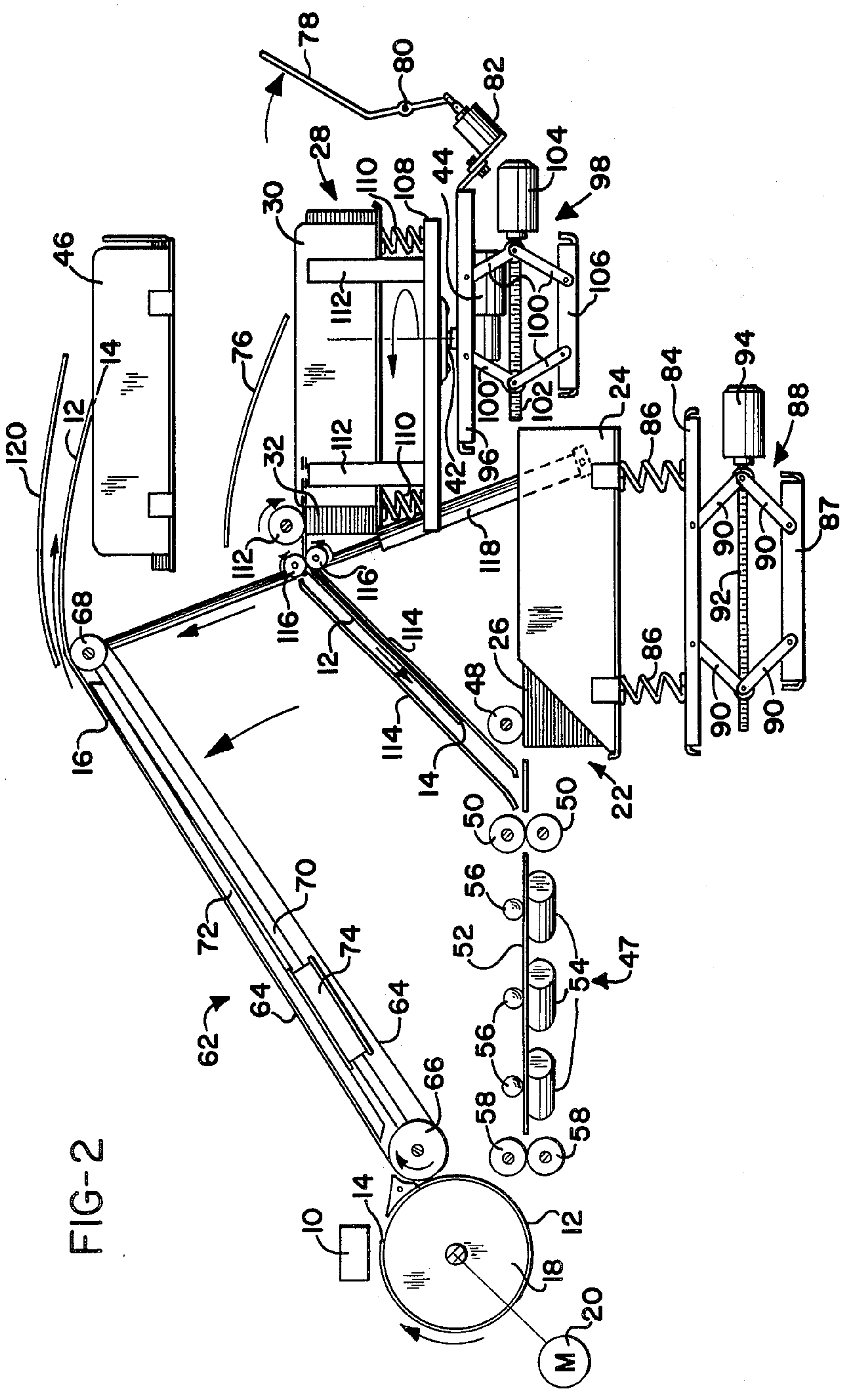
FIG. 2 is a view similar to FIG. 1 illustrating printing of a second side of each of the sheets of paper.

After the printing operation during which the first side of each of the sheets is printed and after the sheets have been accumulated in tray 30, the tray is rotated by motor 44 as indicated in FIG. 2. Prior to rotation of the tray 30, however, it is necessary to move the back stop 78 away from the tray so as not to interfere with rotation of the tray. For this purpose, solenoid 82 is actuated to pivot the paper stop 78 about pivot point 80, as indicated. The axis of rotation of the tray 30 is offset, such that rotation of the tray 30 brings the stack of sheets 32 into position beneath a sheet feed roller 112. Platen 96 is then raised such that the proper force is applied by the roller 112 against the topmost of the sheets in stack 32.

Wire guides 114 and pinch rollers 116 provide a means for supplying a sheet of paper from the second paper supply means 28 to the first paper moving means 47 such that a print image may be printed on the second side of each of the sheets as the sheets are delivered to the drum 18 in the manner described above. Note that each of the sheets from stack 32 is delivered to the drum 18 with the first edge 14 being the leading edge and the second side of each sheet facing the printer 10 for printing a print image thereon.

Prior to the second printing operation, pneumatic cylinder 118 is extended, as shown in FIG. 2, for moving the second paper moving means 62 with respect to the output tray 46, such that the second paper moving means 62 extends between the drum 18 and the output means 46 and the output means receives each of the sheets of paper after the second side of each sheet has been printed. Wire form guides 120 are provided to guide the trajectory of the sheets 12 into the tray 46.

Figure 5:
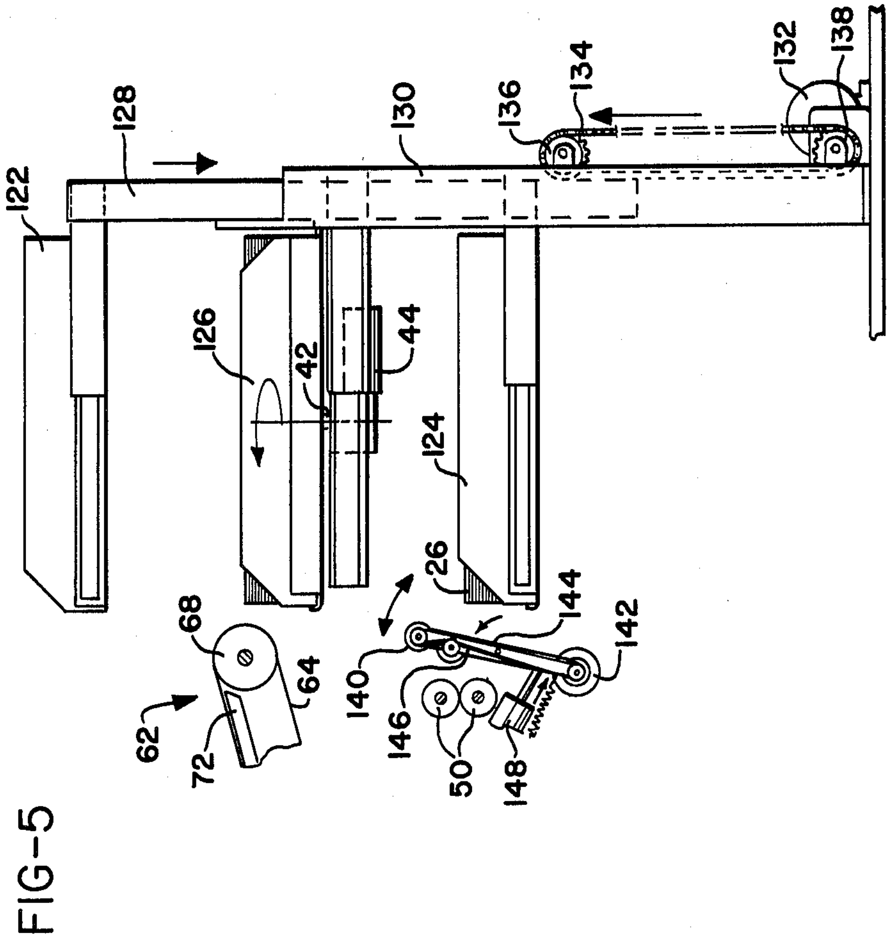
FIG. 5 is a view illustrating a second embodiment of the duplex printing arrangement of the present invention after printing of a first side of each of the sheets of paper.
Figure 6:
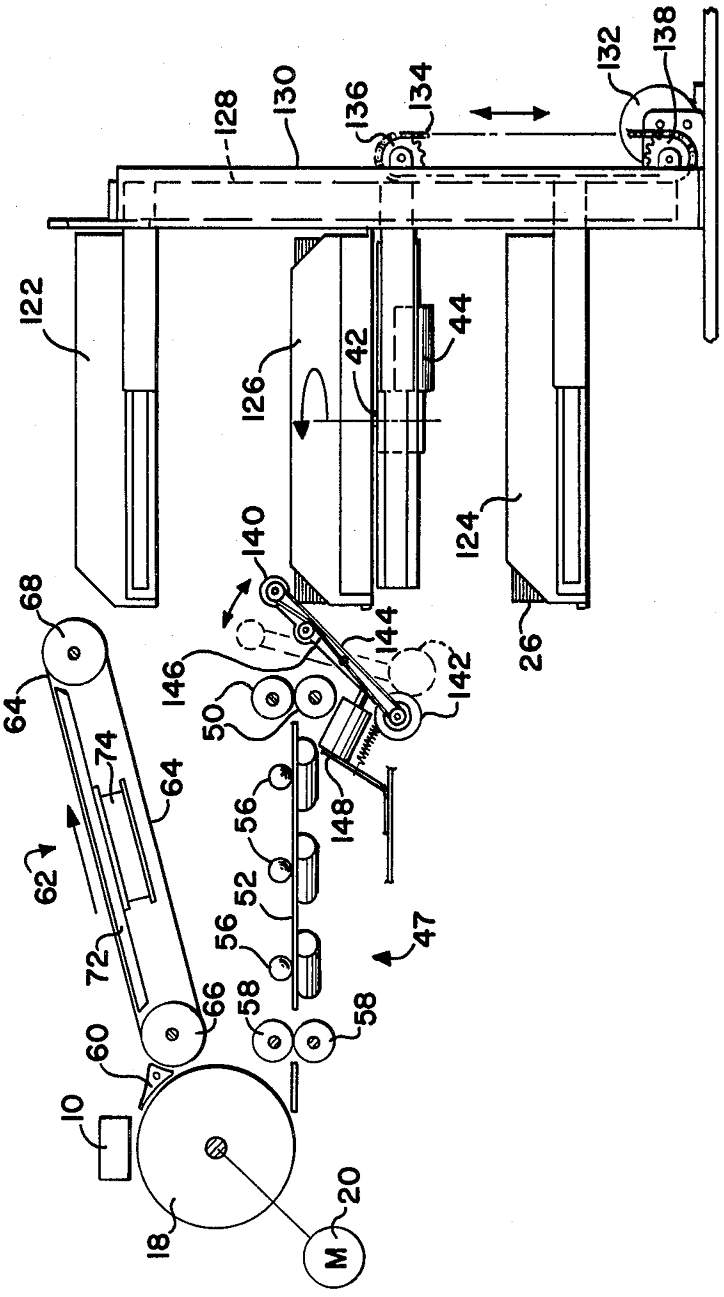
FIG. 6 is a view similar to FIG. 5 illustrating printing of a second side of each of the sheet of paper.

Reference is now made to FIGS. 5 and 6 which illustrate an alternative embodiment of the present invention. The primary distinction between the embodiment of FIGS. 1 and 2 and the embodiment of FIG. 5 is that, whereas the second paper moving means 62 in the embodiment of FIG. 1 is raised by the cylinder 118 to bring it into proximity with the output tray 46, in the embodiment of FIGS. 5 and 6 the output tray 122 and the trays 124 and 126 defining the first and second paper supply means, respectively, are lowered from the positions illustrated in FIG. 5 into the position shown in FIG. 6 prior to printing on the second side of each of the sheets.

The first paper supply means includes tray 124 which is mounted on vertically movable support member 128. The second paper supply means includes tray 126 which is mounted on shaft 42 for rotation by motor 44. Tray 126 and output tray 122 are also mounted on member 128. Member 128 is movable vertically within a guide frame 130 by motor 132. Motor 132 drives chain 134 which extends around idler sprocket 136 and drive sprocket 138. Sprockets 136 and 138 are supported on guide 130 and chain 134 is attached to the member 128 adjacent the lower end thereof.

When the first side of each of a plurality of sheets of paper is to be printed, tray 124 is moved upward adjacent the first paper moving means 47, as shown in FIG. 5, with the top sheet of stack 26 pressed against paper feed roller 140. Roller 140 is driven by motor 142 via belt 144, thus supplying each of the sheets of paper to the drum 18 for printing. Since the second paper supply means defined by tray 126 is also attached to member 128, tray 126 is, at this point, adjacent the end of the second paper moving means 62, as shown in FIG. 5, and each of the sheets of paper, after having a print image printed on the first side, is directed to the second paper supply means. After the sheets of paper have been printed on their first sides, arm 146 is pivoted to the position shown in dashed lines by solenoid actuator 148, thus permitting the member 128 and the trays mounted thereon to be lowered into the position shown in FIG. 6. At the same time, the tray 126 and the sheets accumulated therein are rotated end-for-end on shaft 42 by motor 44. Arm 146 is thereafter pivoted such that roller 140 moves downward and engages the top sheet in tray 126 for feeding the sheets of paper from the second paper supply means to the drum 18. When all of the sheets have been printed on both sides, the sheets may be removed from output tray 122.

While the apparatus herein described and the method by which the apparatus operates constitute preferred embodiments of the invention, it is to be understood that the invention is not limited to this precise method and forms of apparatus, and that changes may be made therein without departing from the scope of the invention.

What is claimed is:

1. A duplex printing arrangement for printing on both sides of a plurality of rectangular sheets of paper, each of said sheets having a pair of parallel opposite edges, comprising a printer for printing a print image on a sheet as the sheet is transported past the printer in a direction perpendicular to said pair of parallel opposite edges, paper transport means for transporting a sheet of paper past said printer in a direction perpendicular to said pair of parallel opposite edges, first paper supply means for supplying each of said plurality of sheets in succession to said paper transport means such that a first side of each of said sheets is facing said printer for printing thereon, and a first edge of said pair of parallel opposite edges of each sheet precedes the other of said pair of parallel opposite edges as each sheet is transported past said printer by said paper transport means, second paper supply means for receiving each of said sheets of paper from said paper transport means after a print image is printed on said first sides of said plurality of sheets, and, thereafter, supplying each of said plurality of sheets in succession to said paper transport means such that a second side of each of said sheets is facing said printer and said first edge of each sheet precedes the other of said pair of parallel opposite edges as each sheet is transported past said printer by said paper transport means, whereby the top of the print images on both sides of each sheet of paper are adjacent the same edge of each sheet.

2. The duplex printing arrangement of claim 1 further comprising output means for receiving each of said plurality of sheets of paper from said paper transport means after the second side of each sheet has been printed.

3. The duplex printing arrangement of claim 1 in which said second paper supply means comprises a paper receiving tray for receiving successively sheets of paper from said paper transport means after a print image is printed thereon, with each sheet moving into said tray with the first edge of each sheet being the leading edge, and means for rotating said paper receiving tray and said sheets of paper end-for-end such that said plurality of sheets of paper are thereafter supplied in succession to said paper transport means with said first edge of each sheet being the leading edge.

4. The duplex printing arrangement of claim 1 in which said paper transport means comprises a paper supporting drum positioned adjacent said printer and means for rotating said drum.

5. The duplex printing arrangement of claim 4 in which said paper transport means further comprises means for transporting each of said sheets of paper from said first paper supply means to said paper supporting drum, and means for transporting said sheets of paper between said second paper supply means and said drum.

6. The duplex printing arrangement of claim 2 in which said paper transport means comprises a paper support drum positioned adjacent said printer, means for rotating said drum, first paper moving means extending between said first paper supply means and said drum for loading a sheet of paper from said first paper supply means onto said drum such that a print image may be printed on said first side, second paper moving means extending between said drum and said second paper supply means for moving a sheet of paper from said drum to said second paper supply means, means for supplying a sheet of paper from said second paper supply means to said first paper moving means such that a print image may be printed on said second side, and means for moving said second paper moving means with respect to said output means such that said second paper moving means extends between said drum and said output means and said output means receives each of said sheets of paper after the second side of each sheet has been printed.

7. The duplex printing arrangement of claim 6 in which said first and second paper supply means, and said output means are stationary and in which said second paper moving means is movable from a first position in which it extends between said drum and said second paper supply means to a second position in which it extends between said drum and said output means.

8. The duplex printing arrangement of claim 6 in which said means for supplying a sheet of paper from said second paper supply means to said first paper moving means comprises means for moving said second paper supply means into position adjacent said first paper moving means.

9. The duplex printing arrangement of claim 8 in which said first and second paper moving means are stationary and in which said means for moving said second paper moving means with respect to said output means comprises means for moving said output means into position adjacent said second paper moving means.

10. A method of duplex printing in which print images are printed on both sides of a plurality of rectangular sheets of paper, each of said sheets having a pair of parallel opposite edges, such that the top of the print images on both sides of each sheet of paper are adjacent the same edge of the sheet, comprising:

transporting each of said plurality of sheets of paper in succession past a printer in a direction perpendicular to said pair of parallel opposite edges of the sheet with a first side of each of said sheets facing the printer and a first edge of each of said sheets being the leading edge, printing a print image on said first side of each of said sheets as each of said sheets is transported past said printer, accumulating said sheets of paper at a paper duplex station as the first side of each of said sheets is printed, transporting each of said sheets of paper collected at said duplex station past said printer in succession with the first edge of each of said sheets being the leading edge and the second side of each of said sheets facing said printer, printing a print image on said second side of each of said sheets as each of said sheets is transported past said printer, and accumulating said plurality of sheets after printing on both sides thereof.

11. The method of claim 10 in which said step of accumulating said sheets of paper at said paper duplex station includes the further step of rotating each of said sheets end-for-end.

12. The method of claim 11 in which said step of rotating each of said sheets end-for-end comprises the step of rotating said sheets end-for-end simultaneously at said paper duplex station.

* * * * *